US009589007B2

(12) United States Patent
Wagner et al.

(10) Patent No.: US 9,589,007 B2
(45) Date of Patent: Mar. 7, 2017

(54) METHOD FOR ISSUING MULTIPART RECEIPTS IN CONNECTION TO EXTENSIVE DATABASE OPERATIONS (71) Applicant: Apple Inc., Cupertino, CA (US)

(72) Inventors: Richard F. Wagner, San Francisco, CA (US); Olivier Bonnet, Mountain View, CA (US); Derrick S. Huhn, San Francisco, CA (US); Nicholas K. Puz, Campbell, CA (US); Amol V. Pattekar, San Jose, CA (US); Jeremy M. Werner, Burlingame, CA (US); James H. Callender, San Francisco, CA (US); Kenneth B. McNeil, San Jose, CA (US)

(73) Assignee: Apple Inc., Cupertino, CA (US)

( * ) Notice: Subject to any disclaimer, the term of this patent is extended or adjusted under 35 U.S.C. 154(b) by 486 days.

(21) Appl. No.: 13/913,305

(22) Filed: Jun. 7, 2013

(65) Prior Publication Data
US 2014/0365429 A1 Dec. 11, 2014

(51) Int. Cl.
G06F 17/00 (2006.01)
G06F 17/30 (2006.01)

(52) U.S. Cl.
CPC .. G06F 17/30345 (2013.01); G06F 17/30368 (2013.01)

(58) Field of Classification Search
CPC ............... G06F 17/30345; G06F 17/30368
USPC ........................................ 707/609
See application file for complete search history.

(56) References Cited

U.S. PATENT DOCUMENTS

| 7,490,112 | B1 | 2/2009 | Suresh et al. | |
| 7,503,052 | B2 | 3/2009 | Castro et al. | |
| 8,171,074 | B2* | 5/2012 | Nakazawa | G06F 9/485 709/201 |
| 8,291,032 | B2 | 10/2012 | Lamb et al. | |
| 8,341,118 | B2 | 12/2012 | Drobychev et al. | |
| 9,128,748 | B2* | 9/2015 | Mizrachi | G06F 9/46 703/14 |
| 2005/0222969 | A1* | 10/2005 | Yip | H04L 41/0813 707/999.001 |
| 2007/0124351 | A1* | 5/2007 | Nakazawa | G06F 9/485 708/130 |
| 2011/0124406 | A1* | 5/2011 | Blackburn | G07F 17/323 463/25 |
| 2011/0191092 | A1* | 8/2011 | Mizrachi | G06F 9/46 703/14 |

(Continued)

Primary Examiner — Phong Nguyen
(74) Attorney, Agent, or Firm — Downey Brand LLP (57) ABSTRACT Disclosed herein is a technique for providing status feedback on the execution of a database request. The technique involves receiving a database request that defines an operation to be performed on at least one data record stored in a database. The data record is updated in the database in accordance with the operation, and one or more tasks that are to be performed in connection to the operation are scheduled for execution. A first version of a receipt is generated and provided to the application, and includes, for each of the one or more tasks, a status field that indicates a progress of executing the task. The method further includes the steps of, in response to a change in the execution of any of the one or more tasks, updating the status fields to produce a second version of the receipt, which is then provided to the application.

20 Claims, 7 Drawing Sheets (56) References Cited

U.S. PATENT DOCUMENTS

2011/0246434 A1* 10/2011 Cheenath ............ G06F 17/3038
          707/703
2012/0185591 A1*  7/2012 Nakazawa .............. G06F 9/485
          709/224

* cited by examiner

METHOD FOR ISSUING MULTIPART RECEIPTS IN CONNECTION TO EXTENSIVE DATABASE OPERATIONS

TECHNICAL FIELD

The invention relates generally to computing devices. More particularly, embodiments of the invention relate to a method for issuing multipart receipts in connection to extensive database operations.

BACKGROUND

The proliferation of client computing devices—such as smart phones and tablets—has significantly increased the complexity of the manner in which client software and server software communicate and work with one another. User demands for instant feedback and speed from software applications continue to increase as well, and are presenting new challenges for software developers. Consider, for example, a smart phone application that enables users to upload digital photographs and comment on one another's digital photographs. Designers of this application would, at least under conventional database design paradigms, configure a database for the application to include a separate table for each of the different types of data accessed by the application, e.g., a table for user accounts, a table for digital photographs binary data, and a table for digital photograph comments, where fields in the tables are tied to one another to establish relationships between the data.

In the above example, particular database operations—such as a deletion of a digital photograph from a user's account—require additional tasks to be executed, such as updating a global database index table, deleting all comments associated with the digital photograph, updating derived fields (e.g., an overall rating) associated with the digital photograph, etc., which can take a considerable amount of time to execute. Notably, under conventional design approaches, the client device sits idly and waits for an acknowledgement response from the server, which, problematically, is only issued by the server after all of the aforementioned tasks are completed on the server's end. As a result, the user often experiences confusion and frustration, and his or her overall experience is negatively impacted, which is unacceptable and should be avoided.

SUMMARY

Accordingly, embodiments of the invention set forth a new technique for issuing multipart "receipts" in connection to extensive database operations. In particular, a database operation that is issued by a client device—and requires at least one additional task to be executed in connection with a database operation—is received by a server, and the server periodically issues receipts to the client device as the tasks are carried out. This provides the benefit of enabling the client device to maintain an up-to-date snapshot of the server's progress of executing the tasks, which can be used to provide more immediate and accurate feedback to the user and enhance the user's overall experience.

One embodiment of the invention sets forth a method for providing status feedback on the execution of a database request. In particular, the method is executed by a server device and includes the steps of receiving, from an application executing on a client device, the database request, where the database request defines an operation to be performed on at least one data record stored in a database, and the data record is updated in the database in accordance with the operation. Next, one or more tasks that are to be performed in connection to the operation are identified and scheduled for execution. A first version of a receipt is then generated and provided to the application, where the first version of the receipt includes, for each of the one or more tasks, a status field that indicates a progress of executing the task. The method further includes the steps of, in response to a change in the execution of at least one of the one or more tasks, updating the status field that corresponds to the at least one of the one or more tasks to produce a second version of the receipt, which is then provided to the application.

Another embodiment of the invention sets forth a method for receiving and managing status feedback received in connection to an execution of a database request. In particular, the method is carried out by a client computing device, and includes the steps of issuing, to a server, a database request that defines an operation to be performed on at least one data record stored in a database. The method also includes the steps of receiving, from the server, a first version of a receipt, where the first version of the receipt includes, for each of one or more tasks that the server scheduled to execute in connection to the database request, a status field indicating a progress of executing the task.

Yet another embodiment of the invention sets forth a method for updating a receipt that indicates a progress of executing one or more tasks in connection to a database request received from a client device. In particular, the method is carried out by a computing device that is in communication with a server, and includes the steps of removing, from a data storage, a next task to be executed, where the next task was created in connection to an execution of the database request, and is associated with a status field included in the receipt. The method also includes the steps of executing the task, and, during execution of the task, providing at least one update to the status field included in the receipt, where each update made to the status field causes an updated version of the receipt to be transmitted to the client computing device.

Another embodiment of the invention sets forth a non-transitory computer readable storage medium storing instructions that, when executed by a processor, cause the processor to implement any of the methods described above. Yet another embodiment of the invention sets forth a system that includes components configured to implement any of the method steps described above.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing portable computing devices. These drawings in no way limit any changes in form and detail that may be made to the invention by one skilled in the art without departing from the spirit and scope of the invention. The embodiments will be readily understood by the following detailed description in conjunction with the accompanying drawings, wherein like reference numerals designate like structural elements.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

As described above, embodiments of the invention provide a technique for issuing multipart receipts in connection to database operations (also referred to herein as "database changes") that require one or more tasks to be carried out in addition to the database operation itself. In particular, embodiments of the invention enable an application executing on a client device to issue a database change request to a server and to receive updates about the server's progress in executing the tasks. According to one embodiment, the application issues a database change request to the server, whereupon the server persists the database change request into a database so that the database change request is secure and prepared for processing. In turn, the server identifies one or more tasks that are required to be executed in conjunction with the database request, and generates a receipt (e.g., a data object) that includes a status field for each of the one or more tasks. The server then transmits the receipt to the application to indicate to the application—without requiring that all of the one or more tasks first complete in execution—that the database change request is acknowledged and is being processed by the server.

Notably, embodiments of the invention beneficially enable the application to maintain an up-to-date snapshot of the progress being made by the server whenever a database change request requires additional tasks to be carried out. In one embodiment, an updated receipt is "pushed" out to the application each time a status field within the receipt is updated, e.g., when the execution of a particular task is completed. This approach provides the benefit of enabling the application to be notified of important changes on the server's side without having to consume resources by periodically polling the server for updated receipt information. Alternatively, the application can issue on its own terms a request to the server to receive (i.e., "pull") an updated receipt from the server. This approach provides the benefit of enabling the application to prevent the server from transmitting updates that are irrelevant to the application, e.g., a notification that a deep deletion has completed long after the main objective of a database change request is completed.

Figure 1:
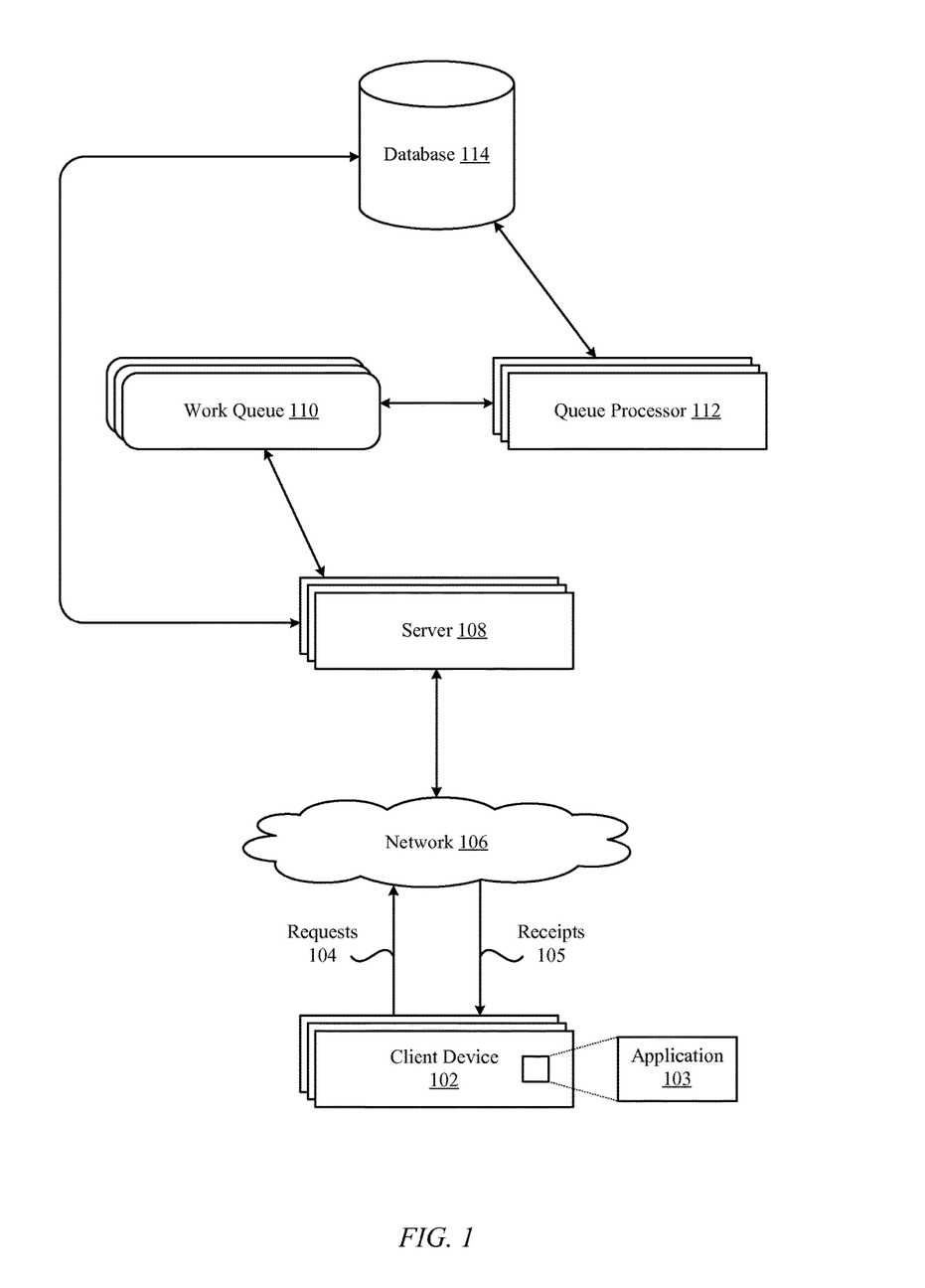
FIG. 1 illustrates a block diagram of a computer system configured to implement the various embodiments of the invention.

FIG. 1 illustrates a block diagram of a computer system 100 configured to implement the various embodiments of the invention. More specifically, FIG. 1 illustrates a high-level overview of the computer system 100, which includes client devices 102, servers 108, work queues 110, queue processors 112, and a database 114. As shown in FIG. 1, the client device 102 is configured to execute an application 103, which, as described in greater detail below, is configured to interact with software executing on the servers 108 via a network 106 (e.g., the Internet). In particular, the application 103 is configured to generate database change requests (e.g., requests 104) and transmit the database change requests to one or more servers 108 for handling. In turn, the servers 108 identify additional tasks that are to be carried out in connection to the database change request, and enqueue the tasks into the work queues 110 such that the tasks are scheduled to execute in accordance with the queue processors 112. Next, the servers 108, without first waiting for the tasks to complete in execution, issue to the application 103 a receipt 105 that includes status fields for related to the processing of the tasks.

In one embodiment, the work queues 110 are implemented as databases and are configured to operate in a first-in-first-out (FIFO) manner such that the tasks are addressed and executed according to the order in which they are received. The queue processors 112 are configured to remove and execute the tasks from the work queues 110 and to update the respective status fields included the receipt 105. According to one embodiment, the servers 108 are configured to transmit an updated receipt 105 to the application 103 whenever a status field is updated within the receipt 105. The servers 108 can also be configured to deliver an updated receipt 105 to the application 103 when the application 103 queries the servers 108 to transmit an updated receipt 105.

The database 114 can be implemented using known database technologies, e.g., structured query language (SQL) technology, and include tables for storing data that is targeted by the database change requests transmitted by the client devices 102. As noted above, the data utilized by the application 103 can be organized within the database 114 in a manner that requires one or more tasks to be carried out when a database change request is received. For example, the database 114 can include a table used for indexing the data stored within other tables belonging to the database 114. The database 114 can also enable subscriptions to data, e.g., to enable notifying a user of a new comment made to a digital photograph on which he or she previously commented. The database can further include derived fields, e.g., a field that aggregates numerical ratings provided against a restaurant, where the derived field must be periodically updated as ratings are added, changed, or removed from the database 114. Also, as mentioned above, the relationships between tables within the database 114 can also require deep deletes to be carried out when a record is removed from the database. Notably, each of these tasks can take a considerable amount of time to execute, and should not prevent the client device 102 from receiving a response to the initial database change request within a reasonable amount of time (e.g., a few seconds).

Figure 2:
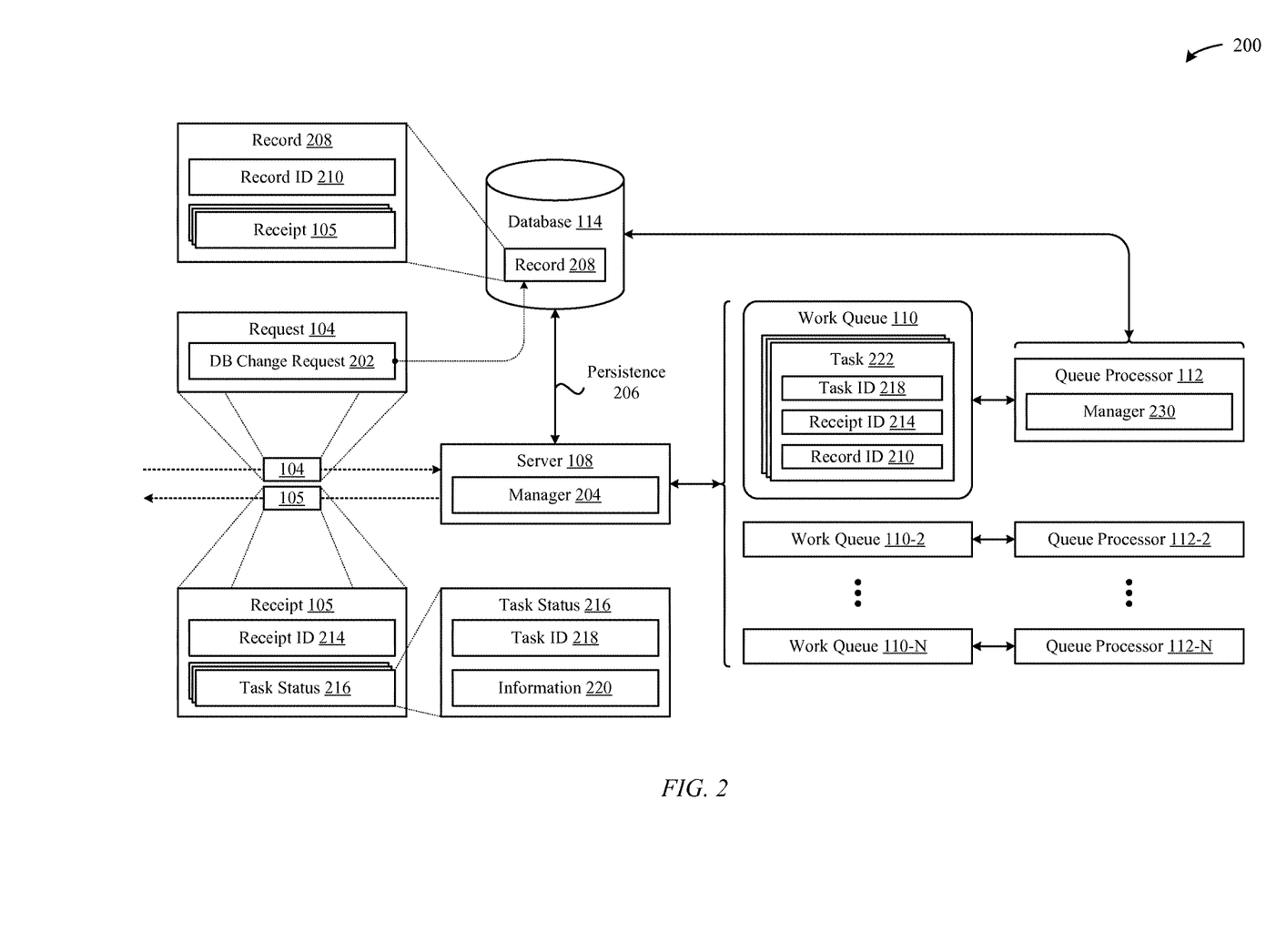
FIG. 2 illustrates a more detailed view of key components of the computer system of FIG. 1, according to one embodiment of the invention.

FIG. 2 is a block diagram 200 that provides a more detailed view of several of the components illustrated in FIG. 1, according to one embodiment of the invention. As shown in FIG. 2, the request 104 is configured to include a database change request 202 that defines a particular operation to occur within the database 114. For example, the database change request 202 can include instructions to add a new record to the database 114, and include the data to be stored in the record. In another example, the database change request 202 can include an identification (ID) that corresponds to a record within the database 114 and include instructions to modify or delete the record. Again, the application 103 is configured to generate requests 104 and transmit the requests 104 to the server 108, which, as shown in FIG. 2, includes a manager 204 that is configured to carry out various techniques described herein.

More specifically, the manager 204 is configured to receive and persist requests 104 to the database 114 (represented by persistence 206 in FIG. 2). In this manner, the requests 104—and the database change requests 202 included therein—are secured within the database 114 and can be prepared for processing. In one embodiment, the request 104 is persisted to the database 114 as a record 208, which, as shown includes a record ID 210 that uniquely identifies the record 208 within the database 114. The manager 204 analyzes each database change request 202 to determine one or more tasks 222 (described below) that should be carried out in connection to the database change request 202, and generates a receipt 105—which, as shown in FIG. 2, is referenced by record 208. Notably, in FIG. 2, the record 208 references multiple receipts 105, and is representative of the record 208 including a receipt 105 for each update made to the record 208 over time.

As shown in FIG. 2, in one embodiment, the receipt 105 can include a receipt ID 214 and a task status field 216 for each of the one or more tasks that are to be carried out in connection to the database change request 202. When the receipt 105 is generated and configured, the manager 204 issues the receipt 105 to the appropriate client device 102 (i.e., the client device 102 that issued the request 104) without waiting for each of the tasks to be executed by the queue processors 112. In this manner, the client device 102 receives a more immediate response from the manager 204 whenever the client device 102 issues a request 104, which enhances the speed and flow of the interaction between the client device 102 and the server 108. Notably, the receipt ID 214 can be retained by the application 103 and used to query the manager 204 for an updated receipt 105 whenever the application 103 desires to obtain an updated receipt 105.

FIG. 2 also shows that each task status field 216 can include a task ID 218 and information 220. In one embodiment, a task ID 218 is generated for each of the one or more tasks that are to be carried out in connection to the database change request 202, and uniquely identifies the task within the database 114. The information 220 can be configured to include any data that represents a status of the execution of the task, e.g., a string variable that is updated with phrases such as "enqueued," "in progress," "completed," and the like. The information 220 can also include timing information associated with the task, such as the time at which the task is generated, which can be used to determine a total latency involved in generating and executing the task.

Also shown in FIG. 2 is a more detailed view of the work queues 110, the queue processors 112, and the structure of tasks 222 that are loaded into the work queues 110 and carried out by the queue processors 112. According to one embodiment, a work queue 110 exists for each of the different types of tasks that are carried out in connection with a database change request 202. For example, there can exist a work queue 110 for tasks involving global database index table updates, a work queue 110 for tasks involving deep deletes, a work queue 110 for tasks involving updating derived fields, and so forth. Similarly, there can exist, for each work queue 110, one or more queue processors 112 that are specifically configured to carry out the type of task that is loaded into the work queue 110.

According to one embodiment, and as shown in FIG. 2, the task 222 includes a task ID 218, a receipt ID 214, and a record ID 210, where, as noted above, the task ID 218 uniquely identifies the task 222 within the database 114. Within the task 222, the receipt ID 214 identifies a receipt 105 that includes a task status field 216 that corresponds to the task 222 (via the task ID 218), and, further, the record ID 210 identifies a record 208 that was created alongside the task 222 in response to a database change request 202 received and processed by the manager 204. Moreover, although not illustrated in FIG. 2, each task 222 includes information for carrying out the task 222. For example, a task 222 loaded into a work queue 110 that is configured to store deep-deletion oriented tasks can include instructions to delete all or particular entries within the database 114 that reference the record ID 210. This information can be established by one or more managers 204 that possess the tools for determining how the tasks 222 should be generated in response to a database change request 202.

Accordingly, FIGS. 1-2 provide a detailed breakdown of how the various components of the computer system 100 are designed to interact with one another. To supplement this information, FIG. 3 illustrates a sequence diagram 300 that sets forth the manner in which an application 103 (executing on a client device 102), a manager 204 (executing on a server 108), and one or more managers 230 (executing on queue processors 112) communicate between one another to carry out a request 104 that is configured according to FIGS. 1-2.

As shown, the sequence diagram 300 begins at step 302, where the application 103 issues a database change request 202 (via a request 104). At step 304, the manager 204 persists the database change request 202 to the database 114, as illustrated in FIG. 2 by the persistence 206. At step 306, the manager 204 populates work queues 110 with tasks 222 associated with the database change request 202. At step 308, the manager 204 generates and transmits a receipt 105 that includes a task status field 216 for each task 222 created at step 306. At step 310, the application 103 receives and processes the receipt 105. At step 312, one or more managers 230—which are configured to execute the tasks 222 stored in the work queues 110—remove the tasks 222 from the work queues 110 and process the tasks 222 according to the techniques described above in conjunction with FIG. 2.

At step 314, the manager 204 identifies an update made to at least one task status field 216 included in the receipt 105. At step 316, the manager 204 transmits the updated receipt 105 to the application 103. At step 318, the application 103 processes the updated receipt 105. As previously set forth herein, the application 103 is also able to request one of the servers 108 to return an updated receipt 105, which is represented by the optional steps 320-322. At step 324, the managers 230 complete the work queue tasks 222. At step 326, the manager 204 transmits the completed receipt 105. At step 328, the application 103 processes the completed receipt 105.

Figure 3:
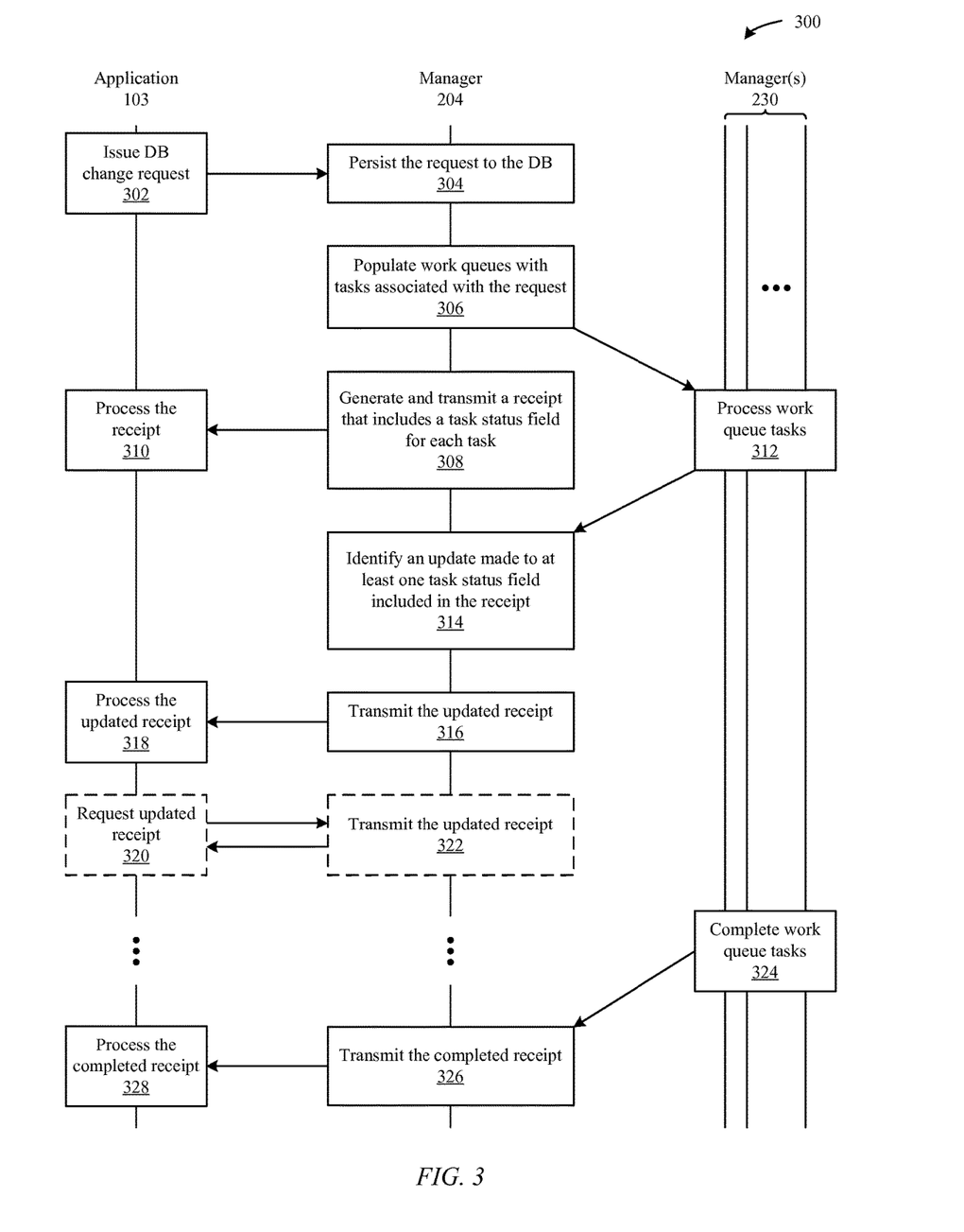
FIG. 3 illustrates a sequence diagram that sets forth the manner in which various components illustrated in FIGS. 1-2 communicate between one another to carry out the techniques described herein, according to one embodiment of the invention.
Figure 5:
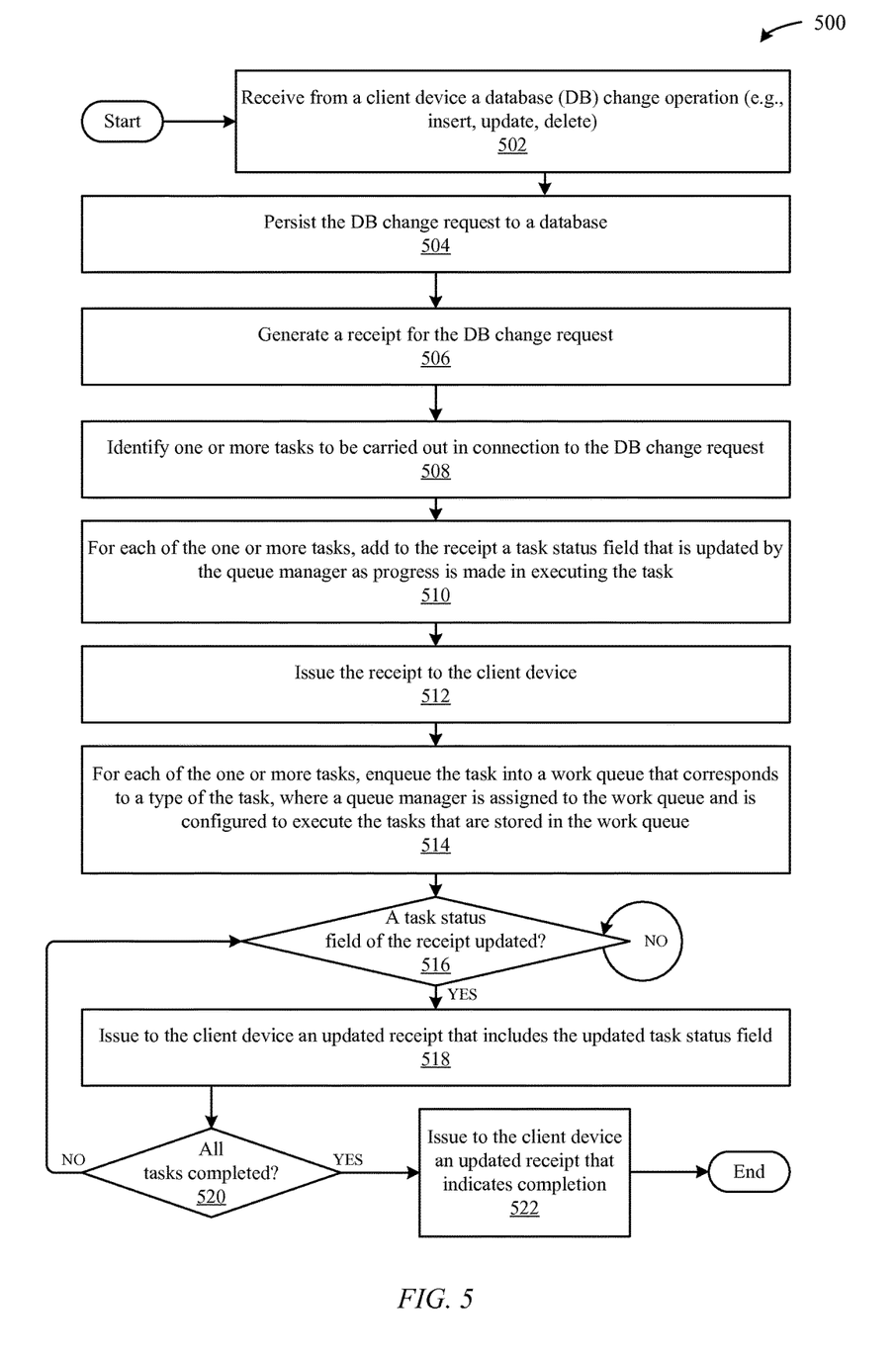
FIG. 5 illustrates a method carried out by a manager executing on a server, according to one embodiment of the invention.
Figure 6:
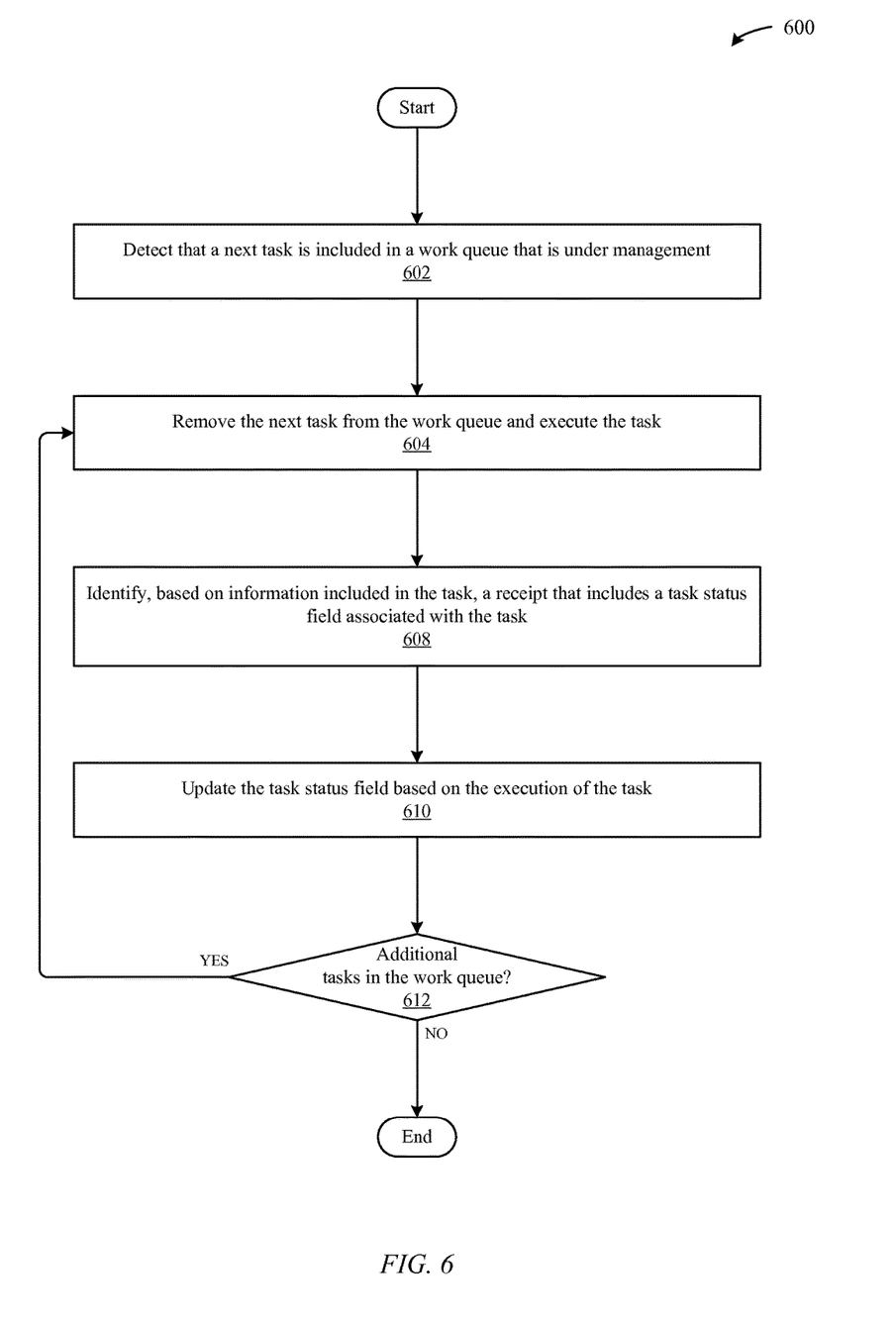
FIG. 6 illustrates a method carried out by a manager executing on a computing device, according to one embodiment of the invention.

Notably, although the sequence diagram of FIG. 3 ends at step 328, those having skill in the art will understand that the sequence diagram 300 is merely representative of a high-level example that highlights the interaction between the application 103, the manager 204, and the managers 230. Accordingly, FIGS. 1, 2, and 3 provide an overview of how the different components of the computer system 100 communicate with one another to carry out the various embodiments of the invention. However, to provide additional details, method diagrams are illustrated in FIGS. 4, 5, and 6, and represent the manner in which each of the components is configured to handle the various requests that are passed between one another within the computer system 100.

Figure 4:
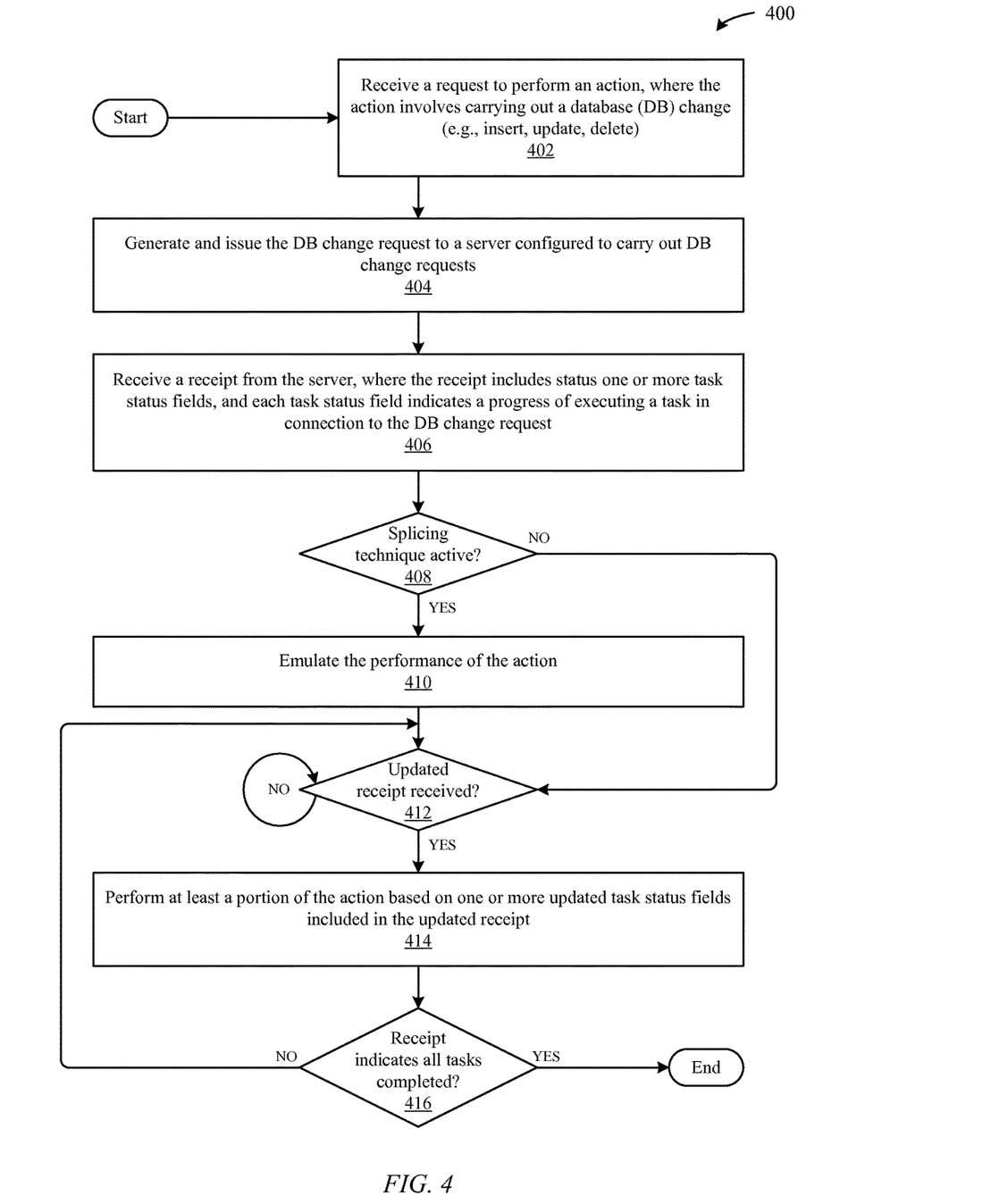
FIG. 4 illustrates a method carried out by an application executing on a client device, according to one embodiment of the invention.

In particular, FIG. 4 illustrates a method 400 carried out by an application 103 executing on a client device 102, according to one embodiment of the invention. In particular, the application 103 is configured to interface with a manager 204 executing on a server 108, e.g., via application programming interface (API) calls that enable the client device 102 to communicate with the manager 204. As shown, the method 400 begins at step 402, where the application 103 receives a request 104 to perform an action, where the action involves carrying out a database change (e.g., an insert, an update, or a delete). At step 404, the application 103 generates and issues the database change request 202 to a manager 204 executing on a server 108, which, as set forth above, is configured to carry out database change requests 202.

At step 406, the application 103 receives a receipt 105 from the server 108, where the receipt 105 includes status one or more task status fields 216, and each task status field 216 indicates a progress of executing a task 222 in connection to the database change request 202.

At step 408, the application 103 determines whether a splicing technique is active. Specifically, the splicing technique refers to the application 103 being configured to emulate an occurrence of an action before the action has actually occurred. Consider, for example, a smartphone application that is configured to upload voice memos into cloud storage. Consider further that the voice memo, once uploaded into the cloud storage, undergoes additional audio filtering (e.g., speech-to-text conversion) that requires a considerable amount of time to execute. In this example, there is no reason for the smartphone application to remain in a pending state while the voice memo is filtered. Accordingly, the smartphone application can be configured to, for example, update a user interface displayed on the smartphone and make it appear to the user as if the voice memo has been completely uploaded and processed.

Accordingly, if, at step 408, the application 103 determines that splicing technique active, then the method 400 proceeds to step 410, where the application 103 emulates the performance of the action. Alternatively, if no splicing technique is active, then the method 400 proceeds to step 412, where the application 103 determines whether an updated receipt 105 is received from the server 108. If, at step 412, the application 103 determines that an updated receipt 105 is received, then the method 400 proceeds to step 414, which is described below. Otherwise, the application 103 waits at step 412 until an updated receipt 105 is received from the server 108.

At step 414, the application 103 performs at least a portion of the action based on one or more updated task status fields 116 included in the updated receipt 105. This can include, for example, updating a user interface to display a confirmation related to the latest task that has been completed. At step 416, the application 103 determines whether receipt 105 indicates all tasks 222 have been completed. If, at step 416, the application 103 determines that receipt 105 indicates all tasks 222 have been completed, then the method 400 ends, since no additional tasks 222 will be executed. Otherwise, the method 400 proceeds back to step 412, where the method steps 412-416 are repeated until all tasks 222 are completed.

FIG. 5 illustrates a method 500 carried out by a manager 204 executing on a server 108, according to one embodiment of the invention. As noted above, the manager 204 is configured to interface with an application 103, and is further configured to interface with one or more work queues 110 that are configured to store tasks 222 that are associated with a database change request 202 issued by the application 103 (via a request 104). As shown, the method 500 begins at step 502, where the manager 204 receives from a client device 102 a database change request 202 (e.g., an insert, an update, or a delete). At step 504, the manager 204 persists the database change request 202 to the database 114.

At step 506, the manager 204 generates a receipt 105 for the database change request 202. At step 508, the manager 204 identifies one or more tasks 222 to be carried out in connection to the database change request 202. At step 510, the manager 204, for, each of the one or more tasks 222, adds to the receipt 105 a task status field 216 that is updated by the manager 230 as progress is made in executing the task 222. At step 512, the manager 204 issues the receipt 105 to the client device 102.

At step 514, the manager 204, for each of the one or more tasks 222, enqueues the task 222 into a work queue 110 that corresponds to a type of the task 222, where a manager 230 is assigned to the work queue 110 and is configured to execute the tasks 222 that are stored in the work queue 110. At step 516, the manager 204 determines whether a task status field 116 of the receipt 105 is updated. If, at step 516, the manager 204 determines that a task status field 116 of the receipt 105 is updated, then the method 500 proceeds to step 518, described below. Otherwise, the manager 204 waits at step 516 until a task status field 116 of the receipt 105 is updated.

At step 518, the manager 204 issues to the client device 102 an updated receipt 105 that includes the updated task status field 116. At step 520, the manager 204 determines whether all tasks 222 have been completed. If, at step 520, the manager 204 determines that all tasks 222 have been completed, then the method 500 proceeds to step 522, described below. Otherwise, the method 500 proceeds back to step 516, where the method steps 516-520 are carried out according to the techniques described above. Finally, at step 522, the manager 204 issues to the client device 102 an updated receipt 105 that indicates all of the tasks 222 have been completed.

FIG. 6 illustrates a method 600 carried out by a manager 230 executing on a server 108, according to one embodiment of the invention. As previously described herein, the manager 230 is configured to process tasks 222 stored in one or more work queues 110, where each tasks 222 is associated with a database change request 202 and is loaded into a work queue 110 by the manager 204. As shown, the method 600 begins at step 602, where the manager 230 detects that a next task 222 is included in a work queue 110 that is under the management of the manager 230.

At step 604, the manager 230 removes the next task 222 from the work queue 110 and executes the task 222. At step 608, the manager 230 identifies, based on information included in the task 222, a receipt 105 that includes a task status field 116 associated with the task 222. At step 610, the manager 230 updates the task status field 116 based on the status of the execution of the task 222. At step 612, the manager 230 determines whether there are additional tasks 222 in the work queue 110. If, at step 612, the manager 230 determines that there are additional tasks 222 in the work queue 110, then the method 600 proceeds back to step 604, which is carried out by the manager 230 in the manner previously set forth herein. Otherwise, the method 600 ends, since the work queue 110 is empty and no additional tasks 222 require processing.

Figure 7:
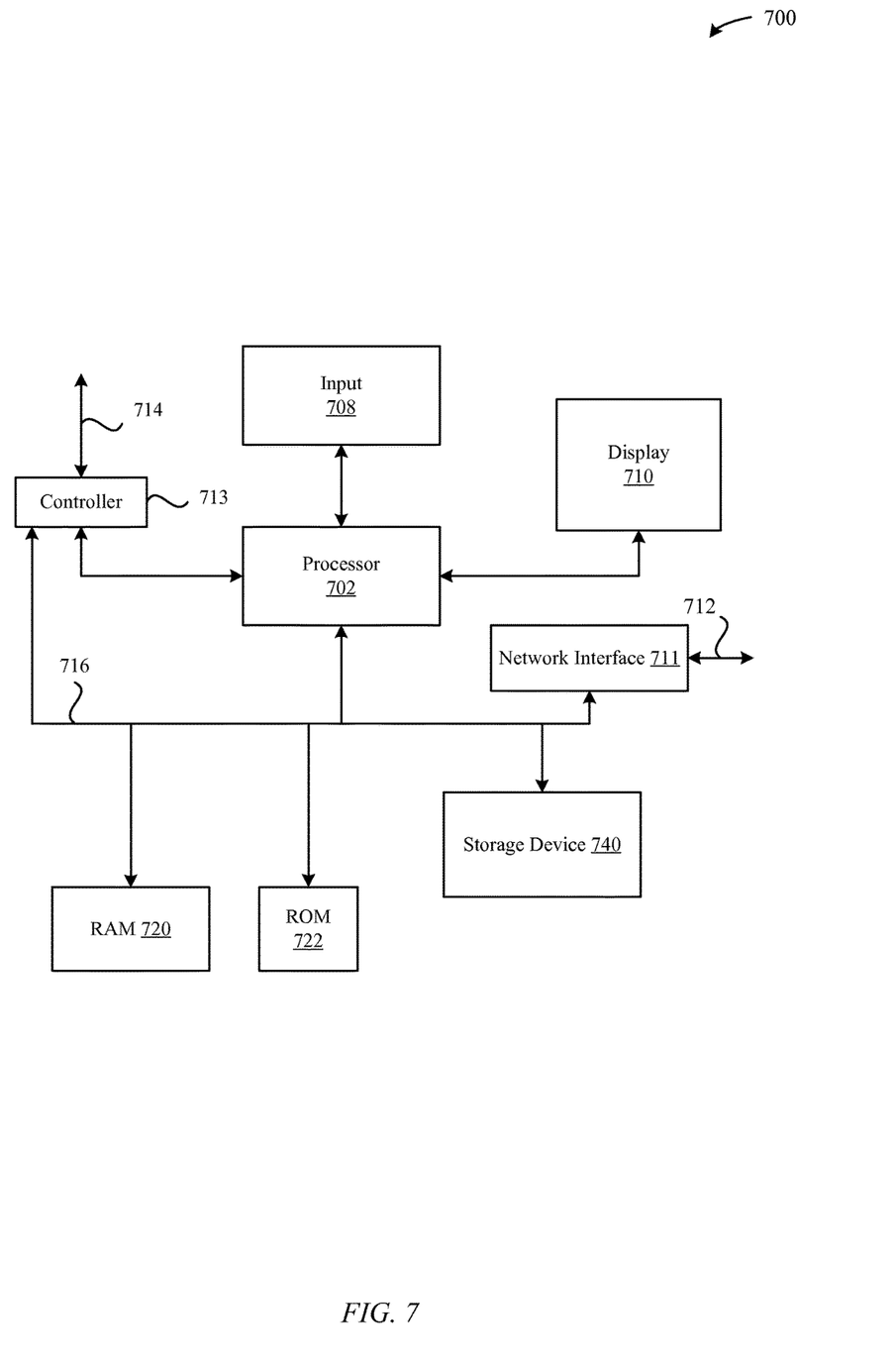
FIG. 7 illustrates a detailed view of a computing device that can be used to implement the various computing devices described herein, according to one embodiment of the invention.

FIG. 7 is a block diagram of a computing device 700 that can represent the components of a client device 102, a server 108, or a queue processor 112. As shown in FIG. 7, the computing device 700 can include a processor 702 that represents a microprocessor or controller for controlling the overall operation of computing device 700. The computing device 700 can also include user input device 708 that allows a user of the computing device 700 to interact with the computing device 700. For example, user input device 708 can take a variety of forms, such as a button, keypad, dial, touch screen, audio input interface, visual/image capture input interface, input in the form of sensor data, etc. Still further, the computing device 700 can include a display 710 (screen display) that can be controlled by processor 702 to display information to the user. Data bus 716 can facilitate data transfer between at least storage devices 740, processor 702, and controller 713. Controller 713 can be used to interface with and control different equipment through equipment control bus 714. The computing device 700 can also include a network/bus interface 711 that couples to data link 712. Data link 712 can allow the computing device 700 to couple to a host computer or to accessory devices. The data link 712 can be provided over a wired connection or a wireless connection. In the case of a wireless connection, network/bus interface 711 can include a wireless transceiver.

The computing device 700 also include a storage device 740, which can comprise a single disk or a plurality of disks (e.g., hard drives), and includes a storage management module that manages one or more partitions (also referred to herein as "logical volumes") within the storage device 740. In some embodiments, storage device 740 can include flash memory, semiconductor (solid state) memory or the like. The computing device 700 can also include Random Access Memory (RAM) 720 and Read-Only Memory (ROM) 722. The ROM 722 can store programs, utilities or processes to be executed in a non-volatile manner. The RAM 720 can provide volatile data storage, and stores instructions related to components of the storage management module that are configured to carry out the various techniques described herein.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

We claim:

1. A method for providing status feedback on an execution of a database request, the method comprising:
    at a server device:
        receiving, from an application executing on a client device, the database request, wherein the database request defines an operation to be performed on at least one data record stored in a database;
        updating the at least one data record in the database in accordance with the operation;
        identifying one or more tasks to perform in connection to the operation;
        scheduling the one or more tasks for execution;
        generating a first version of a receipt that includes, for each task of the one or more tasks, a status field that indicates a progress of executing the task;
        providing the first version of the receipt to the application, wherein the first version of the receipt causes the application to indicate, within a user interface of the application, a completion of at least one task of the one or more tasks prior to the scheduled execution of the at least one task of the one or more tasks being completed; and
        in response to a change in the execution of at least one task of the one or more tasks:
            updating the status field that corresponds to the at least one task of the one or more tasks to yield an updated status field corresponding to the at least one task,
            generating a second version of the receipt, wherein the second version of the receipt includes the updated status field corresponding to the at least one task, and
            providing the second version of the receipt to the application.

2. The method of claim 1, further comprising:
    receiving a request to transmit a third version of the receipt, wherein the third version of the receipt includes up-to-date status fields that indicate the progress of executing the one or more tasks;
    providing the third version of the receipt to the application.

3. The method of claim 1, wherein the operation comprises a database insertion, a database update, a database deletion, or a combination thereof.

4. The method of claim 1, wherein the at least one task of the one or more tasks involves generating a database index for the at least one data record, deleting one or more data records associated with the at least one data record, updating an aggregate data field associated with the at least one data record, or notifying one or more entities that are subscribed to receive updates about changes made to the at least one data record.

5. A non-transitory computer readable storage medium storing instructions that, when executed by a processor associated with a server device, cause the server device to provide status feedback on an execution of a database request, by carrying out steps that include:
   receiving, from an application executing on a client device, the database request, wherein the database request defines an operation to be performed on at least one data record stored in a database;
   updating the at least one data record in the database in accordance with the operation;
   identifying one or more tasks to be performed in connection to the operation;
   scheduling the one or more tasks for execution;
      generating a first version of a receipt that includes, for each task of the one or more tasks, a status field that indicates a progress of executing the task;
   providing the first version of the receipt to the application, wherein the first version of the receipt causes the application to indicate, within a user interface of the application, a completion of at least one task of the one or more tasks prior to the scheduled execution of the at least one task of the one or more tasks being completed;
   generating one or more updated versions of the receipt whenever a particular status field within the receipt is updated in accordance with the execution of the task associated with the particular status field; and
   providing the one or more updated versions of the receipt to the application.

6. The non-transitory computer readable storage medium of claim 5, wherein the steps further include:
   receiving a request to transmit a second version of the receipt, wherein the second version of the receipt includes up-to-date status fields that indicate the progress of executing the one or more tasks;
   providing the second version of the receipt to the application.

7. The non-transitory computer readable storage medium of claim 5, wherein the operation comprises a database insertion, a database update, a database deletion, or a combination thereof.

8. The non-transitory computer readable storage medium of claim 5, wherein at least one task of the one or more tasks involves generating a database index for the at least one data record, deleting one or more data records associated with the at least one data record, updating an aggregate data field associated with the at least one data record, or notifying one or more entities that are subscribed to receive updates about changes made to the at least one data record.

9. A computing system, comprising:
   a database;
   a client computing device; and
   a server configured to receive database requests from the client computing device, wherein the server comprises a processor coupled to a memory, and the processor is configured to:
      receive, from an application executing on the client computing device, a database request, wherein the database request defines an operation to be performed on at least one data record stored in the database;
      update the at least one data record in the database in accordance with the operation;
      identify one or more tasks to be performed in connection to the operation;
      schedule the one or more tasks for execution;
      generate a first version of a receipt that includes, for each task of the one or more tasks, a status field that indicates a progress of executing the task;
      provide the first version of the receipt to the application, wherein the first version of the receipt causes the application to indicate, within a user interface of the application, a completion of at least one task of the one or more tasks prior to the scheduled execution of the at least one task of the one or more tasks being completed; and
      when a particular status field included in the receipt is updated:
         generate an updated version of the receipt, wherein the updated version of the receipt includes an updated status field that indicates the progress of executing a particular task of the one or more tasks corresponding to the particular status field, and
         provide the updated version of the receipt to the application.

10. The computing system of claim 9, wherein the operation comprises a database insertion, a database update, a database deletion, or a combination thereof.

11. The computing system of claim 9, wherein at least one task of the one or more tasks involves generating a database index for the at least one data record, deleting one or more data records associated with the at least one data record, updating an aggregate data field associated with the at least one data record, or notifying one or more entities that are subscribed to receive updates about changes made to the at least one data record.

12. A method for receiving and managing status feedback received in connection to an execution of a database request, the method comprising, at an application executing on a client device:
   issuing, to a server, the database request, wherein the database request defines an operation to be performed on at least one data record stored in a database;
   receiving, from the server, a first version of a receipt, wherein:
      the first version of the receipt includes, for each task of one or more tasks that the server scheduled to execute in connection to the database request, a status field indicating a progress of executing the task, and
      the first version of the receipt is received in response to generation of the first version of the receipt at the server;
   in response to receiving the first version of the receipt, indicating, within a user interface of the application, a completion of at least one task of the one or more tasks prior to the scheduled execution of the at least one task of the one or more tasks being completed; and
   receiving, from the server, an updated version of the receipt, wherein:
      the updated version of the receipt includes an updated status field that indicates the progress of executing a particular task of the one or more tasks, and
      the updated version of the receipt is received in response to generation of the updated version of the receipt at the server.

13. The method of claim 12, further comprising:
issuing, to the server, a request for a second updated version of the receipt; and receiving, from the server, the second updated version of the receipt, wherein the second updated version includes up-to-date status fields that indicate the progress of executing the one or more tasks.

14. The method of claim 12, further comprising, in response to receiving the first version of the receipt, indicating, within the user interface, that the database request is acknowledged by the server and is being processed by the server.

15. A non-transitory computer readable storage medium storing instructions that, when executed by a processor of a computing device, cause the computing device to execute an application configured to receive and manage status feedback received in connection to an execution of a database request, by carrying out steps that include:
   issuing, to a server, the database request, wherein the database request defines an operation to be performed on at least one data record stored in a database;
   receiving, from the server, a first version of a receipt, wherein:
      the first version of the receipt includes, for each task of one or more tasks that the server scheduled to execute in connection to the database request, a status field indicating a progress of executing the task, and
      the first version of the receipt is received in response to generation of the first version of the receipt at the server;
   in response to receiving the first version of the receipt, indicating, within a user interface of the application, a completion of at least one task of the one or more tasks prior to the scheduled execution of the at least one task of the one or more tasks being completed; and
   receiving, from the server, an updated version of the receipt, wherein:
      the updated version of the receipt is received in response to generation of the updated version of the receipt at the server, and
      the updated version of the receipt is generated whenever a particular status field within the receipt is updated in accordance with the execution of a particular task associated with the particular status field.

16. The non-transitory computer readable storage medium of claim 15, wherein the steps further comprising include:
   issuing, to the server, a request for a second updated version of the receipt; and
   receiving, from the server, the second updated version of the receipt, wherein the second updated version includes up-to-date status fields that indicate the progress of executing the one or more tasks.

17. A computing device configured to execute an application configured to manage status feedback received in connection to an execution of a database request, the computing device comprising:
   a processor configured to cause the computing device to carry out steps that include:
      issuing, to a server, the database request, wherein the database request defines an operation to be performed on at least one data record stored in a database;
      receiving, from the server, a first version of a receipt, wherein:
         the first version of the receipt includes, for each task of one or more tasks that the server scheduled to execute in connection to the database request, a status field indicating a progress of executing the task, and
         the first version of the receipt is received in response to generation of the first version of the receipt at the server;
      in response to receiving the first version of the receipt, indicating, within a user interface of the application, a completion of at least one task of the one or more tasks prior to the scheduled execution of the at least one task of the one or more tasks being completed; and
      receiving, from the server, an updated version of the receipt, wherein:
         the updated version of the receipt includes an updated status field that indicates the progress of executing a particular task of the one or more tasks, and
         the updated version of the receipt is received in response to generation of the updated version of the receipt at the server.

18. The computing device of claim 17, wherein the steps further include:
   issuing, to the server, a request for a second updated version of the receipt; and
   receiving, from the server, the second updated version of the receipt, wherein the second updated version includes up-to-date status fields that indicate the progress of executing the one or more tasks.

19. The computing device of claim 17, wherein the steps further include, in response to receiving the first version of the receipt, indicating, within the user interface, that the database request is acknowledged by the server and is being processed by the server.

20. The computing device of claim 17, wherein the operation comprises a database insertion, a database update, a database deletion, or a combination thereof.

* * * * *